(12) United States Patent
Kang et al.

(10) Patent No.: US 10,613,247 B2
(45) Date of Patent: Apr. 7, 2020

(54) METHOD, APPARATUS AND SYSTEM FOR INSPECTING OBJECT BASED ON COSMIC RAY

(71) Applicants: TSINGHUA UNIVERSITY, Beijing (CN); NUCTECH COMPANY LIMITED, Beijing (CN)

(72) Inventors: Kejun Kang, Beijing (CN); Zhiqiang Chen, Beijing (CN); Yuanjing Li, Beijing (CN); Ziran Zhao, Beijing (CN); Junli Li, Beijing (CN); Xuewu Wang, Beijing (CN); Yaohong Liu, Beijing (CN); Zhi Zeng, Beijing (CN); Jianping Gu, Beijing (CN); Song Liang, Beijing (CN); Bicheng Liu, Beijing (CN); Guangming Xu, Beijing (CN); Yongqiang Wang, Beijing (CN)

(73) Assignees: TSINGHUA UNIVERSITY, Beijing (CN); NUCTECH COMPANY LIMITED, Beijing (CN)

( * ) Notice: Subject to any disclaimer, the term of this patent is extended or adjusted under 35 U.S.C. 154(b) by 59 days.

(21) Appl. No.: 15/411,348

(22) Filed: Jan. 20, 2017

(65) Prior Publication Data
US 2017/0329038 A1 Nov. 16, 2017

(30) Foreign Application Priority Data
Jan. 22, 2016 (CN) .......................... 2016 1 0046515

(51) Int. Cl.
*G01V 5/00* (2006.01)
*G01T 5/02* (2006.01)
(Continued)

(52) U.S. Cl.
CPC ............ *G01V 5/0016* (2013.01); *G01T 1/167* (2013.01); *G01T 5/02* (2013.01); *G01V 5/0025* (2013.01);
(Continued)

(58) Field of Classification Search
None
See application file for complete search history.

(56) References Cited

U.S. PATENT DOCUMENTS

| | | | |
|---|---|---|---|
| 7,218,704 B1 | 5/2007 | Adams et al. | |
| 2005/0156734 A1* | 7/2005 | Zerwekh | G01T 1/167 340/539.1 |

(Continued)

FOREIGN PATENT DOCUMENTS

| | | |
|---|---|---|
| CN | 203299146 U | 11/2013 |
| CN | 204731428 U | 10/2015 |
| CN | 105074440 A | 11/2015 |
| WO | WO 2008/127442 A2 | 10/2008 |
| WO | WO 2015/178986 A2 | 11/2015 |

OTHER PUBLICATIONS

European Search Report issued in Application No. 17152523.1 dated Jun. 7, 2017.

(Continued)

*Primary Examiner* — James Choi
(74) *Attorney, Agent, or Firm* — Scully Scott Murphy & Presser

(57) ABSTRACT

The present application relates to a method, apparatus and system for inspecting an object based on a cosmic ray, pertaining to the technical field of radiometric imaging and safety inspection. The method includes: recording a movement trajectory of an inspected object by using a monitoring device; acquiring information of charged particles in the cosmic ray by using a position-sensitive detector, the information of charged particles comprising trajectory information of the charged particles; performing position coinci- (Continued)

dence for the movement trajectory and the trajectory information to determine the object; performing trajectory remodeling for the charged particles according to the information of charged particles; and identifying a material inside the moving object according to the trajectory remodeling. According to the present disclosure, pedestrians who are walking and moving are inspected by using the cosmic ray, and nuclear materials, drugs and explosive materials and the like carried by human bodies may be detected.

18 Claims, 5 Drawing Sheets

(51) Int. Cl.
    *G01T 5/00*       (2006.01)
    *G01T 1/167*     (2006.01)
    *G06K 9/62*       (2006.01)
(52) U.S. Cl.
    CPC ..... *G01V 5/0091* (2013.01); *G01N 2223/205* (2013.01); *G01T 5/002* (2013.01); *G01V 5/0075* (2013.01); *G06K 9/6267* (2013.01)

(56) References Cited

U.S. PATENT DOCUMENTS

| | | | | |
|---|---|---|---|---|
| 2007/0102648 A1* | 5/2007 | Shpantzer | ............ | G01N 21/171 250/394 |
| 2014/0332685 A1* | 11/2014 | Anghel | ................ | G01N 23/046 250/307 |
| 2014/0361186 A1* | 12/2014 | Chandrasekharan | ........................ | G01V 5/0075 250/390.11 |
| 2016/0041297 A1* | 2/2016 | Blanpied | ................ | G01V 5/005 250/358.1 |
| 2016/0116630 A1* | 4/2016 | Sossong | .................... | G01T 1/18 250/308 |

OTHER PUBLICATIONS

Hoch et al. "tvluon Tomography Algorithms for Nuclear Threat Detection", Dec. 31, 2009.
Hao, J., et al. "The Application of Dual—energy CT Technique in Electron Density Mesaurement" Nuclear Electronics & Detection Technology, 31(10)1082-1085 (2011)—with English abstract.

* cited by examiner

METHOD, APPARATUS AND SYSTEM FOR INSPECTING OBJECT BASED ON COSMIC RAY

TECHNICAL FIELD

The present invention relates to the radiometric imaging and safety inspection technologies, and in particular, to a method, apparatus and system for inspecting an object based on a cosmic ray.

BACKGROUND

With the development of nuclear energy and nuclear technologies, the technical threshold of manufacture of nuclear weapons is being lowered. According to the provisions of the International Atomic Energy Agency, a substances containing uranium 235 or plutonium 239 having a purity of 92% to 93% are defined to be weapons. That is, a specific amount of such nuclear substances (generally, 12-16 kg uranium and 6-9 kg plutonium) may cause explosions. The drastic destruction of the nuclear weapons causes great economic losses, and even severely threatens living and development of human beings.

In addition, illegal spreading of explosive substances and drugs increase criminals and economic losses, and also cause great hazards to humans, families and the entire society. Especially in recent years, the global safety issue is not optimistic, and terroristic organizations and extreme organizations are rampant. These organizations have manufactured a lot of terroristic activities, and cause very severe impacts. For example, the Russian passenger plane crashed down in Egypt, and the terroristic attack taken place in Paris France and the like, which are all the consequences of abuse of explosive substances by the extreme organizations.

Therefore, it is very urgent to strictly control and manage illegal spreading of these materials and substances, reinforce the safeguarding and entity protection technologies, and develop relevant material monitoring and inspection technologies.

Therefore, a method, apparatus and system for inspecting an object based on a cosmic ray are desired.

The above information disclosed in the background portion is only used to reinforce understanding of the background of the present disclosure. Therefore, the above information may include information of the known related arts for persons of ordinary skill in the art.

SUMMARY

The present disclosure discloses a method, apparatus and system for inspecting an object based on a cosmic ray, which are capable of improving the safety inspection efficiency.

Other characteristics, features, and advantages of the present disclosure become obvious over the following description in detail, or are partially derived from practice of the present disclosure.

According to one aspect of the present disclosure, a method for inspecting an object based on a cosmic ray is provided. The method includes: recording a movement trajectory of an inspected object by using a monitoring device; acquiring information of charged particles in the cosmic ray by using a position-sensitive detector, the information of charged particles including trajectory information of the charged particles; performing position coincidence for the movement trajectory and the trajectory information to determine the object; performing trajectory remodeling for the charged particles according to the information of charged particles; and identifying a material inside the moving object according to the trajectory remodeling.

According to an embodiment of the present disclosure, the position-sensitive detector is configured to have the capability of detecting the charged particles of the cosmic ray.

According to an embodiment of the present disclosure, the position-sensitive detector is configured to have the capability of detecting medium to high atomic number materials whose atomic number is greater than that of aluminum, and low atomic number materials whose atomic number is lower than that of aluminum; wherein the low atomic number materials are identified by using a stopping effect of electrons; and the medium to high atomic number materials are identified by using a scattering effect of muons.

According to an embodiment of the present disclosure, the position-sensitive detector includes a GEM detector, an MRPC detector, a drift chamber or a drift tube array.

According to an embodiment of the present disclosure, the position-sensitive detector is configured to act as a portion of a pedestrian inspection system, and the position-sensitive detector is disposed in an inspection passage, wherein an inspected pedestrian passes through the position-sensitive detector.

According to an embodiment of the present disclosure, the performing trajectory remodeling for the charged particles according to the information of charged particles includes: calculating a Ratio parameter of the material according to the trajectory information of the charged particles, and estimating an initial atomic number and an initial relative mass number of the material, wherein the Ratio parameter is a ratio between a scattering parameter and a stopping parameter that are exerted by the material on the charged particles; calculating a radiation length according to a relationship between the initial atomic number and the radiation length and a relationship between the initial relative mass number and the radiation length; acquiring a thickness of the material according to the radiation length; calculating the stopping parameter and the scattering parameter of the material according to the initial atomic number, the initial relative mass number and the thickness of the material; and identifying the material according to the stopping parameter and the scattering parameter, wherein low atomic number materials are identified by using a stopping effect of electrons in the charged particles, and medium to high atomic number materials are identified by using a scattering effect of muons in the charged particles.

According to an embodiment of the present disclosure, the method further includes: reconstructing a material distribution diagram by using an imaging algorithm according to a corresponding relationship between the stopping parameter, the scattering parameter and material properties, wherein the imaging algorithm includes PoCA algorithm and/or MLSD-OSEM algorithm.

According to an embodiment of the present disclosure, the method further includes: updating material information to perform a next iteration.

According to an embodiment of the present disclosure, the method further includes: categorizing the material of the object according to a corresponding relationship between the stopping parameter, the scattering parameter and material properties.

According to an embodiment of the present disclosure, in the trajectory remodeling, a plurality of pieces of trajectory information of the charged particles are parallelly processed.

According to an embodiment of the present disclosure, the trajectory information of the charged particles includes time of incidence, position of incidence, direction of incidence, time of emergence, position of emergence and direction of emergence of the charged particles.

According to an embodiment of the present disclosure, the performing position coincidence for the movement trajectory and the trajectory information to determine the object includes: performing a time difference analysis on the time of incidence and the time of emergence; and coinciding the trajectory information of the charged particles with the time and position of the movement trajectory of the object according to the position of incidence, the position of emergence and the time different analysis.

According to another aspect of the present disclosure, an apparatus for inspecting an object based on a cosmic ray is provided. The apparatus includes: a recording module, configured to record a movement trajectory of an inspected object by using a monitoring device; an acquiring module, configured to acquire information of charged particles in the cosmic ray by using a position-sensitive detector, the information of charged particles including trajectory information of the charged particles; a coinciding module, configured to perform position coincidence for the movement trajectory and the trajectory information to determine the object; a remodeling module, configured to perform trajectory remodeling for the charged particles according to the information of charged particles; and a judging module, configured to identify a material inside the moving object according to the trajectory remodeling.

According to an embodiment of the present disclosure, the position-sensitive detector is configured to have the capability of detecting the charged particles of the cosmic ray.

According to an embodiment of the present disclosure, the position-sensitive detector is configured to have the capability of detecting medium to high atomic number materials whose atomic number is greater than that of aluminum, and low atomic number materials whose atomic number is lower than that of aluminum; wherein the low atomic number materials are identified by using a stopping effect of electrons; and the medium to high atomic number materials are identified by using a scattering effect of muons.

According to an embodiment of the present disclosure, the position-sensitive detector includes a GEM detector, an MRPC detector, a drift chamber or a drift tube array.

According to an embodiment of the present disclosure, the position-sensitive detector is configured to act as a portion of a pedestrian inspection system, and the position-sensitive detector is disposed in an inspection passage, wherein an inspected pedestrian passes through the position-sensitive detector.

According to an embodiment of the present disclosure, the remodeling module includes: an estimating unit, configured to calculate a Ratio parameter of the material according to the trajectory information of the charged particles, and estimate an initial atomic number and an initial relative mass number of the material, wherein the Ratio parameter is a ratio between a scattering parameter and a stopping parameter that are exerted by the material on the charged particles; a radiation length calculating unit, configured to calculate a radiation length according to a relationship between the initial atomic number and the radiation length and a relationship between the initial relative mass number and the radiation length; a thickness calculating unit, configured to acquire a thickness of the material according to the radiation length; and a stopping and scattering calculating unit, configured to calculate the stopping parameter and the scattering parameter of the material according to the initial atomic number, the initial relative mass number and the thickness of the material, and identify the material according to the stopping parameter and the scattering parameter, wherein low atomic number materials are identified by using a stopping effect of electrons in the charged particles, and medium to high atomic number materials are identified by using a scattering effect of muons in the charged particles.

According to an embodiment of the present disclosure, the apparatus further includes: an image reconstructing unit, configured to reconstruct a material distribution diagram by using an imaging algorithm according to a corresponding relationship between the stopping parameter, the scattering parameter and material properties, wherein the imaging algorithm includes PoCA algorithm and/or MLSD-OSEM algorithm.

According to an embodiment of the present disclosure, the apparatus further includes: an updating unit, configured to update material information to perform a next iteration.

According to an embodiment of the present disclosure, the apparatus further includes: a categorizing unit, configured to categorize the material of the object according to a corresponding relationship between the stopping parameter, the scattering parameter and material properties.

According to an embodiment of the present disclosure, the image reconstructing unit includes a plurality of image processing subunits that are parallelly executable, which are configured to parallelly process a plurality of pieces of trajectory information of the charged particles.

According to an embodiment of the present disclosure, the trajectory information of the charged particles includes time of incidence, position of incidence, direction of incidence, time of emergence, position of emergence and direction of emergence of the charged particles.

According to an embodiment of the present disclosure, the coinciding module includes: a time difference analyzing unit, configured to perform a time different analysis on the time of incidence and the time of emergence; and a time and position coinciding unit, configured to coincide the trajectory information of the charged particles with the time and position of the movement trajectory of the object according to the position of incidence, the position of emergence and the time different analysis.

According to still another aspect of the present disclosure, a system for inspecting an object based on a cosmic ray is provided. The system includes: a monitoring device, configured to track a movement trajectory of an inspected object, and record a time-position corresponding relationship of the object; a position-sensitive detector, configured to detect information of charged particles in the cosmic ray, the information of charged particles including trajectory information of the charged particles; and a console, configured to perform position coincidence for the movement trajectory and the trajectory information to determine the moving object, perform trajectory remodeling for the charged particles according to the information of charged particles, and identify a material inside the moving object according to the trajectory remodeling.

According to an embodiment of the present disclosure, the position-sensitive detector is configured to have the capability of detecting the charged particles of the cosmic ray.

According to an embodiment of the present disclosure, the position-sensitive detector is configured to have the capability of detecting medium to high atomic number materials whose atomic number is greater than that of aluminum, and low atomic number materials whose atomic number is lower than that of aluminum; wherein the low atomic number materials are identified by using a stopping effect of electrons; and the medium to high atomic number materials are identified by using a scattering effect of muons.

According to an embodiment of the present disclosure, the position-sensitive detector is configured to act as a portion of a pedestrian inspection system, and the position-sensitive detector is disposed in an inspection passage, wherein an inspected pedestrian passes through the position-sensitive detector.

According to an embodiment of the present disclosure, the position-sensitive detector includes: a first group of position-sensitive detectors, disposed on a first side of the inspection passageway, and configured to measure the position and direction of incident charged particles entering the inspection passageway; and a second group of position-sensitive detectors, disposed on a second side of the inspection passageway that is opposite to the first side, and configured to measure the position and direction of emergent charged particles exiting the inspection passageway.

According to an embodiment of the present disclosure, the position-sensitive detector further includes: a third group of position-sensitive detectors, disposed on a third side of the inspection passageway that is different from both the first side and the second side, and configured to measure the position and direction of the emergent charged particles exiting the inspection passageway; and/or a fourth group of position-sensitive detectors, disposed on a fourth side of the inspection passageway that is different from the first side, the second side and the third side, and configured to measure the position and direction of the emergent charged particles exiting the inspection passageway.

According to an embodiment of the present disclosure, the third group of position-sensitive detectors and/or the fourth group of position-sensitive detectors form an angle of greater than 90 degrees and less than 180 degrees with the second group of position-sensitive detectors.

According to an embodiment of the present disclosure, the position-sensitive detector includes a GEM detector, an MRPC detector, a drift chamber or a drift tube array.

According to an embodiment of the present disclosure, the drift tube array is formed of a plurality of aluminum drift tubes that are arranged to a plurality of super-layer structures, wherein each super-layer structure at least includes a first planar aluminum drift tube in a first direction and a second planar aluminum drift tube in a second direction that is different from the first direction.

According to an embodiment of the present disclosure, the first planar aluminum drift tube and the second planar aluminum drift tube each include two rows aluminum drift tubes that are arranged to be parallel to each other.

According to an embodiment of the present disclosure, the console includes a signal processing unit, configured to receive data of a measurement signal of the incident charged particles from the first group of position-sensitive detectors and a measurement signal of the emergent charged particles from the second group and/or third group and/or fourth group of position-sensitive detectors, wherein based on the measured incident and emergent positions and directions of the charged particles, the signal processing unit analyzes scattering of the charged particles passing the material in the inspection passageway to acquire space distribution of a scattering center in the inspection passageway or trajectory remodeling of the charged particles.

According to an embodiment of the present disclosure, the monitoring device includes one or any combination of: a thermal imager, a camera, a pressure sensor and an optical sensor.

According to an embodiment of the present disclosure, the monitoring device includes a depth camera.

The method, apparatus and system for inspecting an object based on a cosmic ray according to the present disclosure are capable of improving the safety inspection efficiency and enhancing the radiometric imaging quality.

It shall be appreciated that the above general description and the detailed description hereinafter are only illustrative but not for limiting the present disclosure.

BRIEF DESCRIPTION OF THE DRAWINGS

Exemplary embodiments of the present disclosure are described in detail with reference to the accompanying drawings. With such drawings, the above features and other features and advantages would become more obvious.

DETAILED DESCRIPTION

Figure 1:
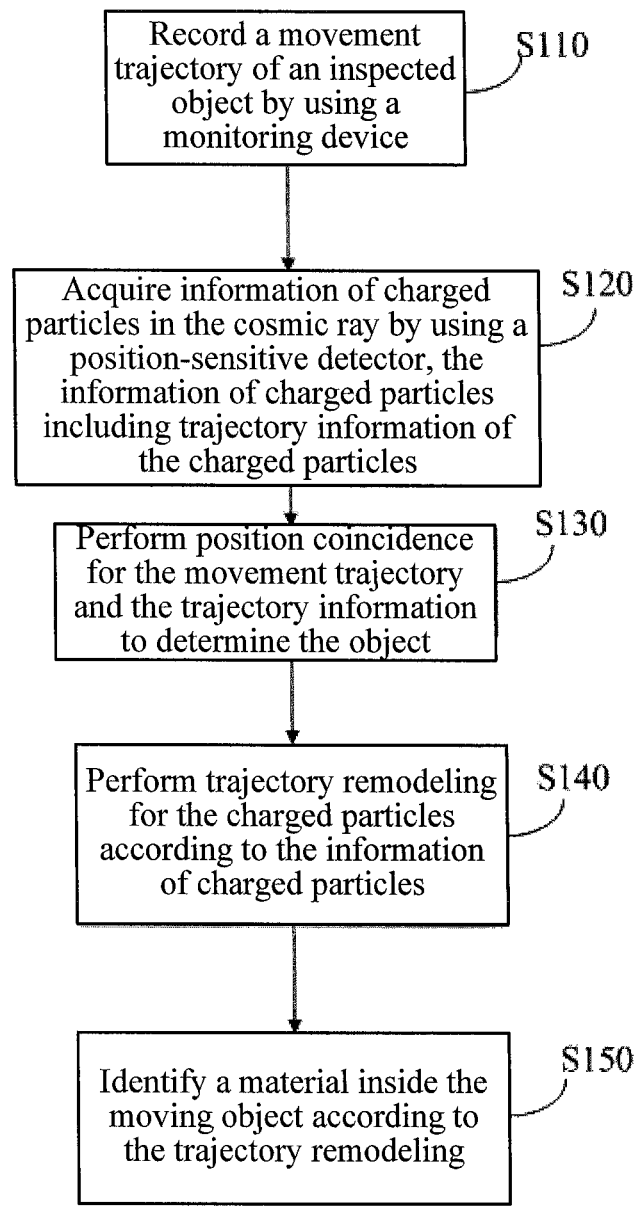
FIG. 1 schematically illustrates a flowchart of a method for inspecting an object based on a cosmic ray according to an exemplary embodiment of the present disclosure.

Exemplary embodiments of the present disclosure are hereinafter described in detail with reference to the accompany drawings. However, the exemplary embodiments may be implemented in a plurality of manners, and shall not be construed as being limited to the implementation described hereinafter. On the contrary, such exemplary embodiments more thoroughly and completely illustrate the present disclosure, and convey the concepts of the exemplary embodiments to persons skilled in the art. In the drawings, like reference numerals denote like or similar structures or elements. Therefore, detailed descriptions of these structures or elements are not given any further.

In addition, the described characteristics, structures, or features may be incorporated in one or more embodiments in any suitable manner. In the description hereinafter, more details are provided such that sufficient understanding of the embodiments of the present disclosure may be achieved. However, a person skilled in the art would be aware that the technical solutions of the present disclosure may be practiced without one or more of the specific details, or may be practiced using other methods, components, materials, apparatuses, steps or the like. Under other circumstances, commonly known structures, methods, apparatuses, practices, materials or operations are not illustrated or described in detail to in case various aspects of the present disclosure become ambiguous.

The block diagrams illustrated in the drawings are merely functional entities, but are not necessarily physically independent entities. That is, these functional entities may be implemented by means of software, or these functional entities or a portion of these functional entities may be implemented in one or a plurality of software hardened modules, or these functional entities may be implemented in different networks and/or processors apparatuses and/or microcontroller apparatuses.

The cosmic ray reaches the earth through the atmosphere. Primary cosmic ray particles are formed of 90% protons and 10% α particles. When the primary cosmic ray particles are 30,000 meters away from the earth when the particles are approaching the earth, these particles collide with nucleons to generate π mesons. In an altitude of 9,000 meters away from the earth, the π mesons are attenuated to muons and neutrinos, and these muons are then partially attenuated to neutrinos and electrons. The cosmic ray particles reaching the surface of the earth are mainly formed of muons, protons and electrons, at a ratio of 70:1:7. The average energy and total flux are as listed in Table 1. The average energy of muons is ¾ GeV, the flux thereof is about 10,000/(minute*m2), the moving speed thereof is 0.998c (c refers to the speed of light), the average half-life period is 2.2*10-6 s, and the angular distribution is in direct proportion to $\cos^2\alpha$ (α refers to a vertical angle).

TABLE 1

| Particle type | Average energy/MeV | Total flux |
| --- | --- | --- |
| Muons | 3928.135 | $1.241 \times 10^{-2}$ $cm^{-2}s^{-1}$ |
| Neutrons | 222.715 | $2.384 \times 10^{-3}$ $cm^{-2}s^{-1}$ |
| Protons | 852.720 | $1.773 \times 10^{-4}$ $cm^{-2}s^{-1}$ |
| γ particles | 28.024 | $1.748 \times 10^{-2}$ $cm^{-2}s^{-1}$ |
| Positive electrons | 111.216 | $1.184 \times 10^{-3}$ $cm^{-2}s^{-1}$ |
| Negative electrons | 77.585 | $1.980 \times 10^{-3}$ $cm^{-2}s^{-1}$ |

(Average Energy and Total Flux of the Cosmic Ray Particles Reaching the Surface of the Earth)

The muons have higher energy, strong penetration, and small scattering cross-section, and thus may substantially not be absorbed in the probe region but may be subjected to scattering. The muons may be used to probe the inner structure of a large object, and measure heavy nuclear substances and the like high-Z substances inside a shielding layer. Material identification and image reconstruction using the muons are mainly based on the following principles: the muons deviates from the original track due to the multiple Coulomb scattering effects when passing through a substance, wherein the scattering density is in positive proportion to the radiation length of the muons in the substance; and since a corresponding relationship exists between the radiation length and the atomic number, the material may be identified according to the scattering angle when the muons pass through the substance.

The electrons are subjected to a more significant scattering effect, have a large scattering cross-section, and may be subjected to great-angle deflection or absorption when passing through low to medium-Z substances within the region covered by the detector. Therefore, the electrons may be used to measure distribution of the low-Z substances such as drugs/explosive materials.

Compared with the traditional X rays, gamma rays, protons, neutrons and the like used in the measurement techniques for substance inspection, such novel inspection technique based on the cosmic ray is highly concerned because the penetration thereof is powerful and no additional radiation protection is needed. This novel inspection technique may be used to probe the inner structure of a large object, and distribution of heavy nuclear substances inside the shielding layer.

In the year 2001, Los Alamos National Laboratory (LANL) in the United States firstly used muons of the cosmic ray for radiometric imaging for the heavy nuclear substances, and proposed a method for differentiating high atomic number materials from low atomic number materials based on multiple Coulomb scattering laws of the muons of the cosmic ray. Thereafter, related studies were conducted in Britain, Italy, Hungary, and Tsinghua University, Nuclear Technology Application Research Institute, China Institute of Atomic Energy of China. In a measurement system, the employed detector is mainly based on a large-area position-sensitive MRPC or drift tube detector array. However, the method and system for identifying a material only based on muons is defective in that the signal collection time is too long or the material differentiation capability is poor.

FIG. 1 schematically illustrates a flowchart of a method for inspecting an object based on a cosmic ray according to an exemplary embodiment of the present disclosure.

As illustrated in FIG. 1, in step S110, a movement trajectory of an inspected object is recorded by using a monitoring device.

According to an exemplary embodiment, the inspected object may be a pedestrian who is inspected in a safety inspection place. The inspected pedestrian is walking, for example, in a pedestrian passageway in the subway, and the position of inspected pedestrian in the passageway may be acquired by using the video surveillance technology. For example, detection and tracking of the pedestrian may be implemented by using a plurality of depth camera covering the passageway. That is, when it is detected that a pedestrian appears, a movement trajectory of the target pedestrian is acquired by using a tracking algorithm, and the position of the pedestrian on the ground of the passageway is calculated in real time and then transferred to a system for inspecting an object. The depth camera may, for example, achieve this objective by using Kinect of Microsoft.

In step S120, information of charged particles in the cosmic ray is acquired by using a position-sensitive detector, wherein the information of charged particles comprises trajectory information of the charged particles.

According to an exemplary embodiment, the position-sensitive detector is configured to have the capability of detecting muons and electrons of the cosmic ray.

According to an exemplary embodiment, the position-sensitive detector includes a GEM detector, an MRPC detector, a drift chamber or a drift tube array.

According to an exemplary embodiment, the position-sensitive detector is configured to act as a portion of a pedestrian inspection system, and the position-sensitive detector is disposed in an inspection passage, wherein an inspected pedestrian passes through the position-sensitive detector.

The present invention is mainly directed to inspection of human bodies, and may also inspect nuclear materials, drugs and explosive materials carried on the human bodies, and inspect pedestrians who are moving. When an inspected pedestrian is slowly walking in the passageway, the monitoring device is capable of monitoring and recording the position of the inspected pedestrian at a specific moment, and performing time and position coincidence with the cosmic ray particles detected by a detector, such that some information of the human body may be acquired. In this way, information is given to indicate whether some prohibited articles are carried by the pedestrian, and thus inspection convenience is enhanced.

According to an exemplary embodiment, the information of charged particles includes the scattering angle, the particle mean momentum, the number of particles, the action area, the action duration and the like. The trajectory information of the charged particles includes time of incidence, position of incidence, direction of incidence, time of emergence, position of emergence and direction of emergence of the charged particles.

In step S130, position coincidence is carried out for the movement trajectory and the trajectory information to determine the object.

According to an exemplary embodiment, the performing position coincidence for the movement trajectory and the trajectory information to determine the object includes: performing a time difference analysis on the time of incidence and the time of emergence; and coinciding the trajectory information of the charged particles with the time and position of the movement trajectory of the object according to the position of incidence, the position of emergence and the time different analysis.

In step S140, trajectory remodeling is carried out for the charged particles according to the information of charged particles.

According to an exemplary embodiment, the trajectory remodeling of the charged particles includes: calculating a Ratio parameter of the material according to the trajectory information of the charged particles, and estimating an initial atomic number and an initial relative mass number of the material, wherein the Ratio parameter is a ratio between a scattering effect and a stopping effect that are exerted by the material on the charged particles; calculating a radiation length according to a relationship between the initial atomic number and the radiation length and a relationship between the initial relative mass number and the radiation length; acquiring a thickness of the material according to the radiation length; and calculating the stopping effect and the scattering effect of the material according to the initial atomic number, the initial relative mass number and the thickness of the material.

According to an exemplary embodiment, the method further includes: reconstructing a material distribution diagram by using an imaging algorithm according to a corresponding relationship between the stopping parameter, the scattering parameter and material properties, wherein the imaging algorithm includes PoCA algorithm and/or MLSD-OSEM algorithm.

According to an exemplary embodiment, the method further includes: updating material information to perform a next iteration.

According to an exemplary embodiment, in the trajectory remodeling, a plurality of pieces of trajectory information of the charged particles are parallelly processed.

The muons and electrons generated based on the cosmic ray depends on the natural density of muons and electrons from the sky that cannot be manually added. Therefore, under the restriction of the entered muons and electrons from the sky, the target needs to be exposed to the entered muons and electros from the sky within a minimum time period, to ensure that a sufficient number of muons and electrons pass through and are subjected to scattering of the inspected object. In this way, a scanning image with sufficient details which may identify the object and/or may be distinguished by the surrounding echo. This operation is referred to as imaging scanning, and the duration of this scanning is specified by the duration of the muons and electrons exposed to the scanning image exposed to a specific quality. A long scanning duration provides more image details than the image acquired using a shorter scanning duration. In the actual inspection system, a balance is made between the inspection throughput (e.g., based on crowd density) and the inspection reliability.

In step S150, a material inside the moving object is identified according to the trajectory remodeling.

According to an exemplary embodiment, the position-sensitive detector is configured to have the capability of detecting medium to high atomic number materials whose atomic number is greater than that of aluminum, and low atomic number materials whose atomic number is lower than that of aluminum; wherein the low atomic number materials are identified by using a stopping effect of electrons; and the medium to high atomic number materials are identified by using a scattering effect of muons.

According to an exemplary embodiment, the method further includes: categorizing the material of the object according to a corresponding relationship between the stopping parameter, the scattering parameter and material properties.

Control, data transmission, image reconstruction and data processing during the entire imaging process are practiced by the console, for example, a computer. When the position information of the inspected pedestrian, responses of the detectors and the like are input to the computer via a data collection apparatus, the computer may process the position information of the inspected pedestrian to acquire the movement trajectory thereof, process the responses of the cosmic ray in the detectors to reconstruct particle information, and perform coincidence between the movement trajectory of the inspected pedestrian and the cosmic ray particles to obtain information of scattering and absorption of the part (or the part corresponding to the carried article) of the human body corresponding to the cosmic ray. As such, reconstruction of a transmission image, a tomoscan image and a three-dimensional image of the object is accomplished, and these images are finally displayed on a display device.

It is judged, according to the above imaging result, whether the inspected pedestrian carries heavy nuclear substances. If it is judged that the inspected pedestrian carries a heavy nuclear substance, the signal processing unit in the computer may further analyze the category of the hazardous article and the position thereof, and generate an alarm via an alarm system. It may be judged, according to the above imaging result, whether the inspected pedestrian carries explosive substances or drugs. If it is judged that the inspected pedestrian carries an explosive substance or drug, the signal processing unit in the computer may further analyze the category of the hazardous article and the position thereof, and generate an alarm via the alarm system.

Embodiments of the present disclosure provide a method for inspecting an object based on a cosmic ray, which is a ultra-highly efficient inspection method using muons and electrons carried in the cosmic ray as an inspection means. By means of the characteristic of higher coverage of the cosmic ray, an inspected object, that is, the inspected pedestrian herein, may be inspected while moving, and a plurality of pedestrians may be simultaneously inspected, which may improve the inspection efficiency to the greatest extent. In addition, since the inspection means employs signals of the natural cosmic ray, no additional hazards are caused to the human body, and thus the method is suitable for inspection of all human groups. Further, medium to high-Z materials such as nuclear materials, and low-Z materials such as drugs and explosive materials may be detected.

Figure 2:
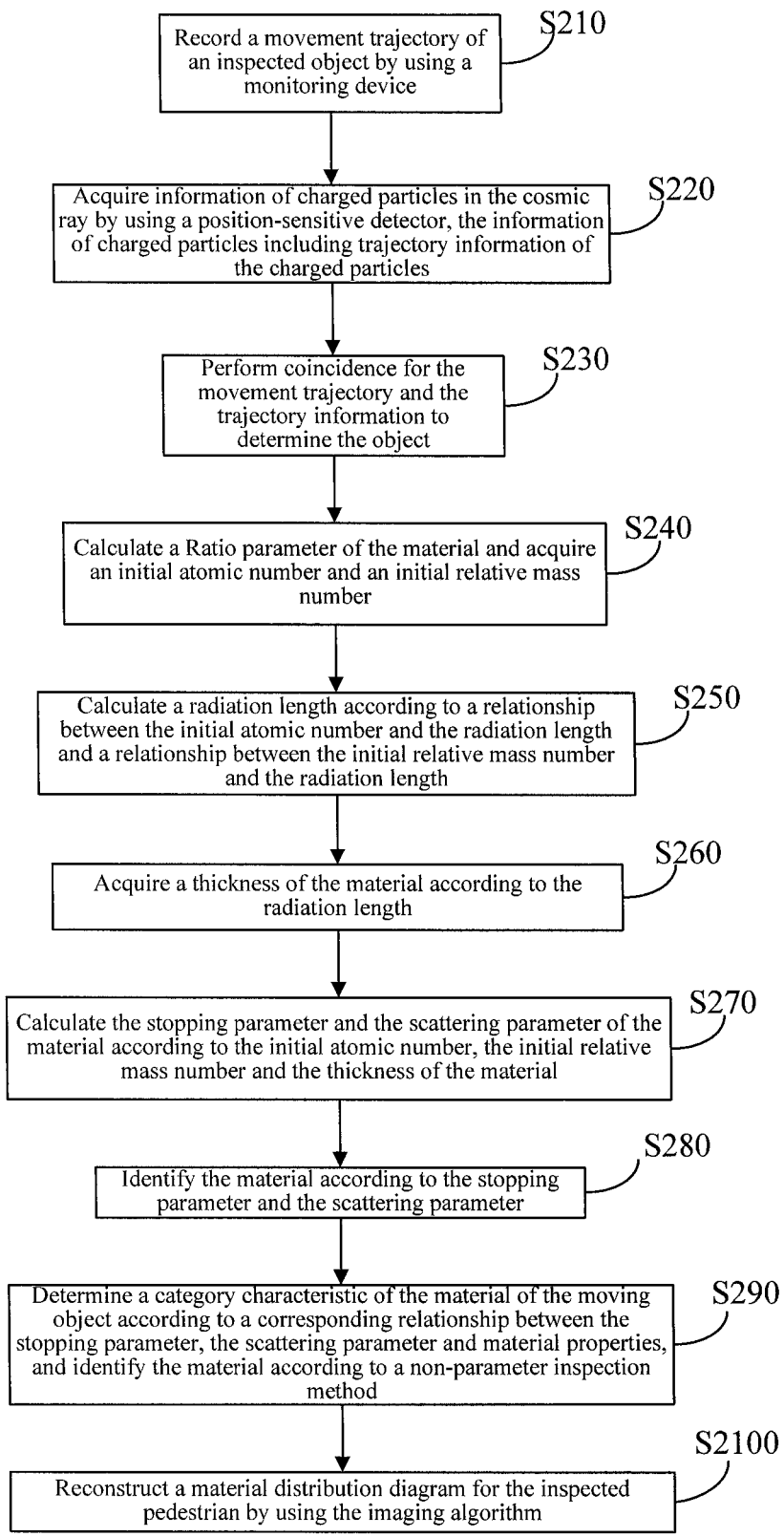
FIG. 2 schematically illustrates a flowchart of a method for inspecting an object based on a cosmic ray according to an exemplary embodiment of the present disclosure.

FIG. 2 schematically illustrates a flowchart of a method for inspecting an object based on a cosmic ray according to an exemplary embodiment of the present disclosure.

As illustrated in FIG. 2, in step S210, a movement trajectory of an inspected object is recorded by using a monitoring device.

Since a pedestrian in the inspection is moving, the trajectory of the pedestrian in the passageway needs to be monitored by using the monitoring device, such that position coincidence is carried out with the cosmic ray particles detected by a detector. The customary method involves a thermal imager, a camera, a pressure sensor, an optical sensor and the like. Detection and tracking of the pedestrian may be implemented by using a plurality of depth camera covering the passageway. That is, when it is detected that a pedestrian appears, a movement trajectory of the target pedestrian is acquired by using a tracking algorithm, and the position of the pedestrian on the ground of the passageway is calculated in real time and then transferred to a system for inspecting an object. The depth camera may, for example, achieve this objective by using Kinect of Microsoft.

In step S220, information of charged particles in the cosmic ray is acquired by using a position-sensitive detector, wherein the information of charged particles comprises trajectory information of the charged particles.

In step S230, coincidence is carried out for the movement trajectory and the trajectory information to determine the object.

The charged particles (the charged particles are mainly muons and electrons above the sea level) in the cosmic ray, when passing through a medium, are subjected to scattering and absorption. A high-sensitivity and large-area position-sensitive detector is capable of detecting the time, position and direction when the particles are incident to or emergent from the medium, such that the scattering angle of the particles is obtained and whether the particles are stopped is known.

In step S240, a Ratio parameter of the material is calculated according to the trajectory information of the charged particles, and an initial atomic number and an initial relative mass number of the material are acquired, wherein the Ratio parameter is a ratio between a scattering effect $R_{scatter}$ and a stopping effect $R_{stop}$ that are exerted by the material on the charged particles.

The parameter Ratio (Ratio=$R_{scatter}/R_{stop}$, wherein $R_{scatter}$ denotes the scattering effect, and $R_{stop}$ denotes the stopping effect) denotes a substance stopping capability obtained by measuring a ratio of the portion of the cosmic ray that is stopped by the substance to the portion of the cosmic ray that is scattered by the substance. Relatively significant specificities are presented for different materials. The separability of the stopping effect of different low-Z substances to the cosmic ray is stronger than of the scattering effect, and on the contrary, the separability of the scattering effect of different low-Z substance to the cosmic array is more stronger. With respect to the high-Z substance whose atomic number is greater than AL, the R parameter presents better linear characteristics.

The parameter Ratio is calculated according to the trajectory of the charged particles of the cosmic ray, which is not relevant to the scattering angle, the particle mean momentum, the number of particles, the action area, the action duration and the like factors. An initial value $Z^0$ ($A^0$, wherein A denotes a relative mass number) of the atomic number is pre-estimated. The initial atomic number of a material may be pre-estimated according to the calibration of the material.

In step S250, a radiation length $L_{rad}$ is calculated according to a relationship between the initial atomic number and the radiation length and a relationship between the initial relative mass number and the radiation length $L_{rad}$.

$L_{rad}$ is calculated according to the following formula:

$$L_{rad} = \frac{716.4 \text{ g} \cdot \text{cm}^{-2} A^0}{\rho \cdot Z^0(Z^0+1)\ln(287/\sqrt{Z^0})}$$

In the above formula, ρ denotes a material density.

In step S260, a thickness L of the material is acquired according to the radiation length $L_{rad}$.

L is calculated according to the following formula:

$$\begin{cases} R_{scatter} = \dfrac{\sigma_\theta^2 \cdot p^2}{L} \\ R_{scatter} == \left(\dfrac{14.1}{c}\right)^2 \cdot \dfrac{1}{L_{rad}} (p \approx 3 \text{ GeV}) \end{cases}$$

In the above formula, $\sigma_\theta$ denotes a scattering angle, and p denotes a mean momentum of the incident particles.

Since the pass-through thickness of a material is critical to accurate calculation of the scattering effect and the stopping effect and identification of the material, the thickness L of the material is acquired according to the radiation length $L_{rad}$ obtained based on the atomic number $Z^0$ ($A^0$). According to a relationship between the estimated $Z^0$ ($A^0$) and the radiation length, the radiation length $L_{rad}$ at this pixel position is obtained, and the thickness L of the material is calculated according to the radiation length $L_{rad}$ and the scattering angle.

In step S270, the stopping parameter and the scattering parameter of the material are calculated according to the initial atomic number, the initial relative mass number and the thickness of the material.

The scattering parameter and the stopping parameter are calculated according to the following formula:

$$\begin{cases} R_{scatter} = \dfrac{\sigma_\theta^2 \cdot p^2}{L} \\ R_{stop} = \dfrac{N_{stop}/(a_{stop} \cdot t_{stop})}{N_{scatter}/(a_{scatter} \cdot t_{scatter})} \cdot \dfrac{p}{L} \end{cases}$$

In the above formulae, $N_{scatter}/(a_{scatter} \cdot t_{scatter})$ denotes the number $N_{scatter}$ of particles which are subjected to a scattering effect with a substance and detected on an $a_{scatter}$ imaging area or volume within a time period $t_{scatter}$, and $N_{stop}/(a_{stop} \cdot t_{stop})$ denotes the number $N_{stop}$ of particles which are subjected to a stopping effect with a substance on an $a_{stop}$ imaging area or volume within a time period $t_{stop}$.

In step S280, the material is identified according to the stopping parameter and the scattering parameter.

In step S290, a category characteristic of the material of the moving object is determined according to a corresponding relationship between the stopping parameter, the scattering parameter and material properties, and the material is identified according to a non-parameter inspection method.

During the imaging course, a plurality of effective trajectories of the charged particles are independent of each other, but may be parallelly executed. Therefore, acceleration may be achieved by using a multi-core CPU or a multi-thread GPU, to improve the speed of image reconstruction.

Since the imaging quality is improved with the increase of the cosmic ray particles, and a singular reconstruction effect may not be ideal, data needs to be updated in real time and a new particle trajectory needs to be added to perform a next iteration.

In step S2100, upon completion of an inspection with respect to the same object, iteration is completed for the effective trajectory of all the charged particles, or when it is preliminarily judged in the above step 290 that a suspected material may exist in the moving object by using the non-parameter inspection method, a material distribution diagram is reconstructed for the inspected pedestrian by using the imaging algorithm according to the corresponding relationship between the stopping parameter, the scattering parameter and the material properties. Through reconstruction of the material distribution diagram, a more ideal reconstructed image may be obtained, and the category and distribution position of the material in the object are better confirmed.

The scattering parameter and the stopping parameter are calculated according to the initial value range, and the material is identified. To be specific, the low atomic number materials are identified mainly according to the stopping effect, including scattering and absorption of the substance to the muons and electrons; and the medium to high atomic number materials are identified mainly according to the scattering effect, that is, the scattering effect of the muons.

The categorization characteristic of a special substance are determined according to the corresponding relationship between the stopping parameter, the scattering parameter and the material properties, and the identification may be carried out quickly according to the non-parameter inspection method or a material distribution diagram may be wholly reconstructed for an inspected vehicle. The imaging course may employ the trajectory remodeling-based point of closest approach (PoCA) algorithm or the maximum likelihood iteration reconstruction-based MLSD-OSEM algorithm or the like. The maximum likelihood sequence detection (MLSD) is an improvement made to the PoCA, wherein the probability statistical information of the scattering angle and the scattering displacement is added. When the reconstructed image is acquired by using the maximum likelihood iteration method, the imaging resolution is higher, and especially the detection result of a substance formed of a plurality of materials is better. The OSEM algorithm improves the convergence speed, and reduces the calculation time. Properly selecting a subset may further improve the imaging quality.

When a distribution region of a hazardous article is found in the image, whether the hazardous article in the moving object is a high-Z nuclear substance or a low-Z drug or explosive material or the like is determined based on an analysis, and alarm information is given an alarm image is displayed. For example, in the image, different categories of hazardous articles are marked in different colors.

Figure 3:
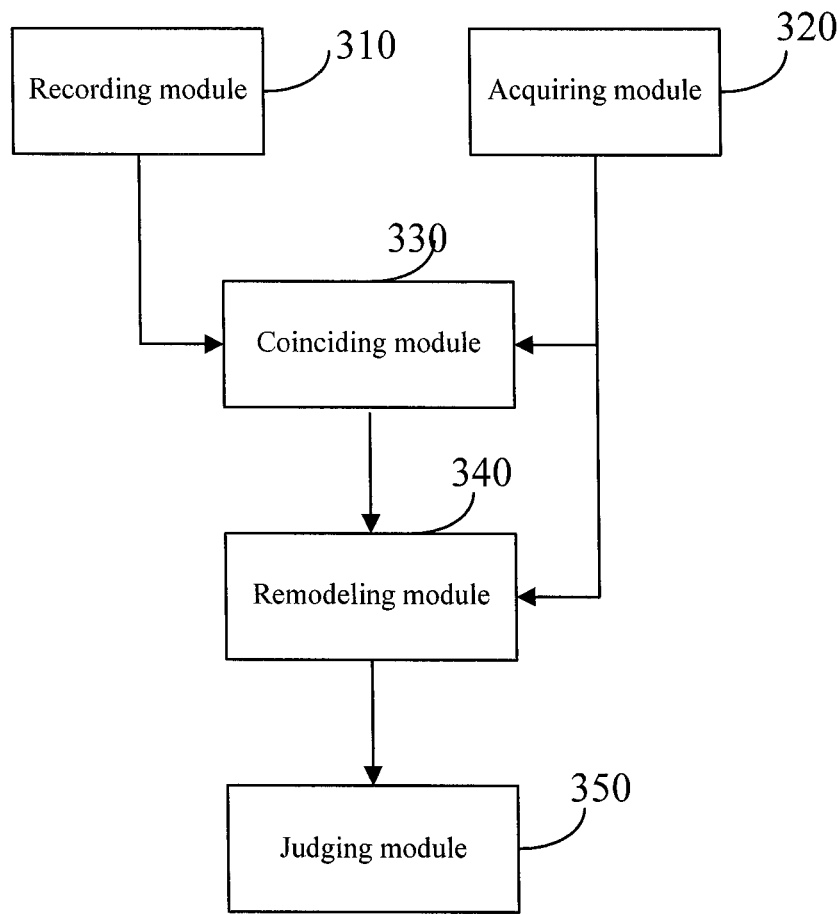
FIG. 3 schematically illustrates a structural diagram of an apparatus for inspecting an object based on a cosmic ray according to an exemplary embodiment of the present disclosure.

FIG. 3 schematically illustrates a structural diagram of an apparatus for inspecting an object based on a cosmic ray according to an exemplary embodiment of the present disclosure.

As illustrated in FIG. 3, the apparatus includes: a recording module 310, configured to record a movement trajectory of an inspected object by using a monitoring device; an acquiring module 320, acquire information of charged particles in the cosmic ray by using a position-sensitive detector, the information of charged particles including trajectory information of the charged particles; a coinciding module 330, configured to perform position coincidence for the movement trajectory and the trajectory information to determine the object; a remodeling module 340, configured to perform trajectory remodeling for the charged particles according to the information of charged particles; and a judging module 350, configured to identify a material inside the moving object according to the trajectory remodeling.

According to an exemplary embodiment, the position-sensitive detector is configured to have the capability of detecting the charged particles of the cosmic ray.

According to an exemplary embodiment, the position-sensitive detector is configured to have the capability of detecting medium to high atomic number materials whose atomic number is greater than that of aluminum, and low atomic number materials whose atomic number is lower than that of aluminum; wherein the low atomic number materials are identified by using a stopping effect of electrons; and the medium to high atomic number materials are identified by using a scattering effect of muons.

According to an exemplary embodiment, the position-sensitive detector is configured to remodel the trajectory of muons and electrons passing through the object based on the signals from the position-sensitive detector; measure an incident momentum and an emergent momentum based on the signals of the position-sensitive detector; determine space distribution of the scattering density in the object; and reconstruct a scanning image in the object according to information of the trajectory, momentum and space distribution of the scattering density in the object.

According to an exemplary embodiment, the position-sensitive detector includes a GEM detector, an MRPC detector, a drift chamber or a drift tube array.

According to an exemplary embodiment, the position-sensitive detector is configured to act as a portion of a pedestrian inspection system, and the position-sensitive detector is disposed in an inspection passage, wherein an inspected pedestrian passes through the position-sensitive detector.

According to an exemplary embodiment, the remodeling module comprises: an estimating unit, configured to calculate a Ratio parameter of the material according to the trajectory information of the charged particles, and estimate an initial atomic number and an initial relative mass number of the material, wherein the Ratio parameter is a ratio between a scattering parameter and a stopping parameter that are exerted by the material on the charged particles; a radiation length calculating unit, configured to calculate a radiation length according to a relationship between the initial atomic number and the radiation length and a relationship between the initial relative mass number and the radiation length; a thickness calculating unit, configured to acquire a thickness of the material according to the radiation length; and a stopping and scattering calculating unit, configured to calculate the stopping parameter and the scattering parameter of the material according to the initial atomic number, the initial relative mass number and the thickness of the material, and identify the material according to the stopping parameter and the scattering parameter, wherein low atomic number materials are identified by using a stopping effect of electrons in the charged particles, and medium to high atomic number materials are identified by using a scattering effect of muons in the charged particles.

According to an exemplary embodiment, the apparatus further includes: an image reconstructing unit, configured to reconstruct a material distribution diagram by using an imaging algorithm according to a corresponding relationship between the stopping parameter, the scattering parameter and material properties, wherein the imaging algorithm includes PoCA algorithm and/or MLSD-OSEM algorithm.

According to an exemplary embodiment, the apparatus further includes: an updating unit, configured to update material information to perform a next iteration.

According to an exemplary embodiment, the apparatus further includes: a categorizing unit, configured to categorize the material of the object according to a corresponding relationship between the stopping parameter, the scattering parameter and material properties.

According to an exemplary embodiment, the image reconstructing unit includes a plurality of image processing subunits that are parallelly executable, which are configured to parallelly process a plurality of pieces of trajectory information of the charged particles.

According to an exemplary embodiment, the trajectory information of the charged particles includes time of incidence, position of incidence, direction of incidence, time of emergence, position of emergence and direction of emergence of the charged particles.

According to an exemplary embodiment, the coinciding module includes: a time difference analyzing unit, configured to perform a time different analysis on the time of incidence and the time of emergence; and a time and position coinciding unit, configured to coincide the trajectory information of the charged particles with the time and position of the movement trajectory of the object according to the position of incidence, the position of emergence and the time different analysis.

With the apparatus for inspecting an object based on a cosmic ray according to the embodiment of the present disclosure, a monitoring device records a movement trajectory of an inspected pedestrian, coincidence is carried out for the cosmic ray particles detected by a detector, cosmic ray particles passing through the human body are detected, and by using the reconstruction algorithm, the category of a article carried by the human body is obtained, for example, a nuclear material, a drug, an explosive material and the like. Since the cosmic ray is employed, the coverage is large and no additional hazards are caused, after the cosmic ray particles coincide with the inspected pedestrian, cooperation and settlement of the inspected pedestrian are not needed. The apparatus may also perform inspection for a plurality of pedestrians, and the inspection is flexible, convenient and efficient. Therefore, the apparatus has a high potentiality in market application.

Figure 4:
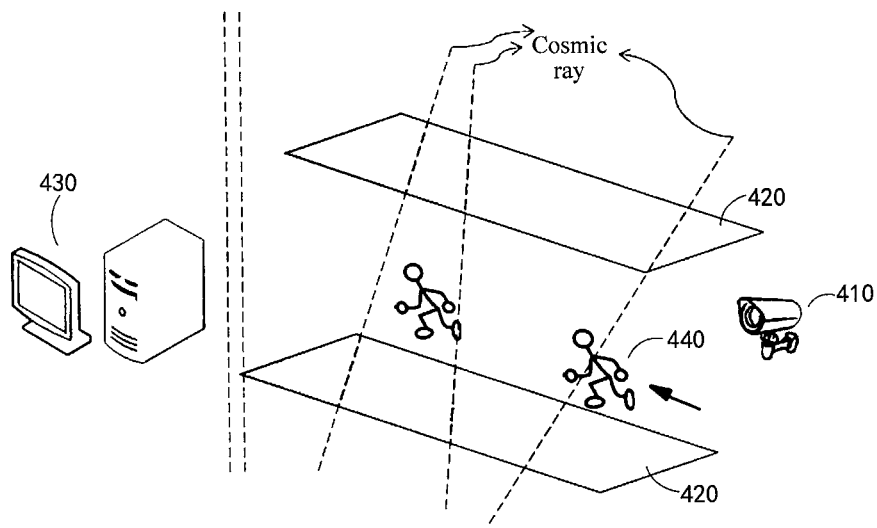
FIG. 4 schematically illustrates a structural diagram of a system for inspecting an object based on a cosmic ray according to an exemplary embodiment of the present disclosure.

FIG. 4 schematically illustrates a structural diagram of a system for inspecting an object based on a cosmic ray according to an exemplary embodiment of the present disclosure.

As illustrated in FIG. 4, the system includes: a monitoring device 410, configured to track a movement trajectory of an inspected object 440, and record a time-position corresponding relationship of the object; a position-sensitive detector 420, configured to detect information of charged particles in the cosmic ray by using a position-sensitive detector, the information of charged particles including trajectory information of the charged particles; and a console 430, configured to perform position coincidence for the movement trajectory and the trajectory information to determine the moving object, perform trajectory remodeling for the charged particles according to the information of charged particles and identify a material inside the moving object according to the trajectory remodeling.

According to an exemplary embodiment, the position-sensitive detector is configured to have the capability of detecting the charged particles of the cosmic ray.

According to an exemplary embodiment, the position-sensitive detector is configured to have the capability of detecting medium to high atomic number materials whose atomic number is greater than that of aluminum, and low atomic number materials whose atomic number is lower than that of aluminum; wherein the low atomic number materials are identified by using a stopping effect of electrons; and the medium to high atomic number materials are identified by using a scattering effect of muons.

According to an exemplary embodiment, the position-sensitive detector is configured to act as a portion of a pedestrian inspection system, and the position-sensitive detector is disposed in an inspection passage, wherein an inspected pedestrian passes through the position-sensitive detector.

According to an exemplary embodiment, the position-sensitive detector includes: a first group of position-sensitive detectors, disposed on a first side of the inspection passageway, and configured to measure the position and direction of incident charged particles entering the inspection passageway; and a second group of position-sensitive detectors, disposed on a second side of the inspection passageway that is opposite to the first side, and configured to measure the position and direction of emergent charged particles exiting the inspection passageway.

According to an exemplary embodiment, the position-sensitive detector further includes: a third group of position-sensitive detectors, disposed on a third side of the inspection passageway that is different from both the first side and the second side, and configured to measure the position and direction of the emergent charged particles exiting the inspection passageway; and/or a fourth group of position-sensitive detectors, disposed on a fourth side of the inspection passageway that is different from the first side, the second side and the third side, and configured to measure the position and direction of the emergent charged particles exiting the inspection passageway.

According to an exemplary embodiment of the present disclosure, the third group of position-sensitive detectors and/or the fourth group of position-sensitive detectors form an angle of greater than 90 degrees and less than 180 degrees with the second group of position-sensitive detectors. In some embodiments, the angle may be 90 degrees. With the angle of greater than and less than 180 degrees, more emergent charged particles may be detected.

According to an exemplary embodiment, the position-sensitive detector includes a GEM detector, a multi-gap resistive plate chambers (MRPC) detector, a drift chamber or a drift tube array.

According to an exemplary embodiment, the drift tube array is formed of a plurality of aluminum drift tubes that are arranged to a plurality of super-layer structures, wherein each super-layer structure at least includes a first planar aluminum drift tube in a first direction and a second planar aluminum drift tube in a second direction that is different from the first direction.

According to an exemplary embodiment, the first planar aluminum drift tube and the second planar aluminum drift tube each include two rows aluminum drift tubes that are arranged to be parallel to each other.

A large-area position-sensitive detector is deployed in the passageway, and a drift tube detector array having a high detection efficiency may be used. The drift tube detector array on each side is formed of three super-layer drift tubes. Around the passageway (at the upper, lower, left and right portion of the passageway), there is a large-area drift tube detector array. The upper drift tube detector array is configured to detect the incident cosmic ray particles, and the other three detector arrays are configured to detect the emergent cosmic ray particles. As such, the particles passing through the detector may be detected, and a response and the like information of the detector may be transferred to the console, for example, a computer. Through processing, the position, time and direction information of the charged particles are obtained. When the cosmic ray particles pass through the human body, a reaction may be caused, and the pedestrian and different objects carried by the pedestrian are subjected to scattering and absorption.

According to an exemplary embodiment, the console includes a signal processing unit, configured to receive data of a measurement signal of the incident charged particles from the first group of position-sensitive detectors and a measurement signal of the emergent charged particles from the second group and/or third group and/or fourth group of position-sensitive detectors, wherein based on the measured incident and emergent positions and directions of the charged particles, the signal processing unit analyzes scattering of the charged particles passing the material in the inspection passageway to acquire space distribution of a scattering center in the inspection passageway or trajectory remodeling of the charged particles.

For example, the system for inspecting an object may include an inspection passageway for the passage of the inspected object (e.g., pedestrians), a first group of position-sensitive detectors that are deployed on a first side of the passageway and configured to measure the position and direction of the incident muons and electrons facing towards the inspection passageway, a second group of position-sensitive detectors that are deployed on a second side of the passageway opposite to the first side and configured to measure the position and direction of the emergent muons and electrons leaving the inspection passageway, and a signal processing unit. The signal processing unit may includes a microprocessor, configured to receive data of the measurement signals of the entered muons and electrons from the first group of position-sensitive detectors and the measurement signals of the emergent muons and electrons from the second group of position-sensitive detectors. Each of the first and second group of position-sensitive detectors may include a drift tube, which is configured to allow measurement of the positions of the muons and electrons in a first direction and measurement of the positions of the muons and electrons in a second direction different from the first direction. The signal processing unit analyzes, according to the measured entered and exited position and direction of the muons and electrons, the scattering effect of the muons and electrons caused by the material in the object, to acquire a space distribution or scanning image of the scattering center in the inspection passageway. The acquired space distribution or scanning image of the scattering center may be used to display whether one or a plurality of objects in the passageway (for example, the high atomic number materials including nuclear materials or devices) are present or not. Each position-sensitive detector may be practiced in various configurations, including a drift unit which is filled with a drift tube having a gas ionized by muons and electrons. Such a system may be configured to use the muons and electrons generated by the natural cosmic ray, and detect one or a plurality of objects in the inspection passage.

The particle detection system may use the drift tube to track, for example, charged particles of muons and electrons in the passageway by using the drift tube.

During implementation of tomoscan imaging, other random processing methods may also be used.

The console is responsible for implementing main control during the operation of the entire system for inspecting an object, including mechanism control, electric control and the like, and processing the data acquired by the monitoring device and the position-sensitive detector and performing coincidence between the movement trajectory of the inspected pedestrian in the passageway and the trajectory of the particles, among the charged particles obtained by the position-sensitive detector, which pass through the human body or the carried luggage, reestablishing a substance category of the material of the carried article, and displaying the substance category via a display. The display may be a CRT traditional display, or may be a liquid crystal display.

The console may be a computer. The computer may be a high-performance single PC, or may be a workstation or a computer group.

A large amount of data generated by the position-sensitive detector during the scanning process, and a large amount of data collected by the monitoring device may be transmitted to the console at the rear end over a wireless transmission or an optical cable, a network cable or the like lines. Wireless transmission may ensure the speed of data transmission, reduce the loss of the signals during the transmission and improve the anti-interference capability during the signal transmission. In the meantime, the technical difficulty and cost of data collection may be lowered to a great extent.

According to an exemplary embodiment, the monitoring device includes one or any combination of: a thermal imager, a camera, a pressure sensor and an optical sensor.

According to an exemplary embodiment, the monitoring device includes a depth camera.

Since a pedestrian in the inspection is moving, the monitoring device is configured to record the trajectory of the pedestrian in the passageway, such that position coincidence is carried out with the cosmic ray particles detected by a detector. Any technique that is capable of positioning the moving target object may be used to record the position information of the inspected pedestrian at each moment. With respect to simultaneous inspection of a plurality of pedestrians, the position information of each pedestrian at each moment may be recorded.

When the inspected pedestrian passes through the system for inspecting an object, since the speed of the cosmic ray particles is much greater than the walking speed of the pedestrian, movement of the pedestrian causes no impact to the trajectory of the cosmic ray particles. When sufficient particles pass through the human body and the trajectory thereof is detected by the detector, and after the trajectory coincides with the movement trajectory of the pedestrian, the desired information may be acquired by using a specific reconstruction process.

According to an exemplary embodiment, the apparatus may further include an alarm device and a prompt device. For example, the console may provide a graphic user interface. When no suspected article is found through scanning, an "pass" indicator marked in green is generated for the inspected object; and when a suspected article is found, an "alarm" indicator marked in red is generated for the inspected object.

With the system for inspecting an object based on a cosmic ray according to the embodiment of the present disclosure, a large-area position-sensitive detector is employed to detect charged particles in the cosmic ray, and a plurality of layers of detectors are deployed around the pedestrian passageway which are capable of detecting an incident trajectory and an emergent trajectory of the particles. In addition, the position of a pedestrian at each moment is recorded by using a monitoring device, scattering and absorption coefficients of the charged particles upon passing through the human body or the parcel or luggage carried thereon may be obtained at each moment, and then the category of a material of the article carried on the human body is obtained through reconstruction.

Figure 5:
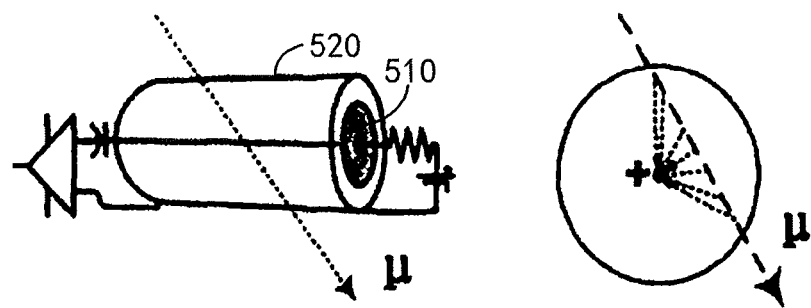
FIG. 5 schematically illustrates a structural diagram of a drift tube of a position-sensitive detector in the system for inspecting an object based on a cosmic ray according to an exemplary embodiment of the present disclosure.

FIG. 5 schematically illustrates a structural diagram of a drift tube of a position-sensitive detector in the system for inspecting an object based on a cosmic ray according to an exemplary embodiment of the present disclosure.

As illustrated in FIG. 5, the position-sensitive detector is described by using an aluminum drift detector array as an example. A central anode 510 of a single drift tube is a gold plated tungsten wire, and a cathode 520 thereof is a thin aluminum tube, wherein the terminal and the aluminum tube are sealed by using the high air pressure method and high pulse voltage method. Primary ionization occurs at the position where the charged particles are incident to the drift tube to generate electrons, the electrons drift to the anode wire to generate an avalanche, and the anode wire receives signals which are subjected to coupling, amplification, discrimination, denoising and the like. As such, the drift time is measured and the position of particles is calculated.

According to an exemplary embodiment, to prevent the diffusion from affecting the position resolution, each drift tube may include a non-combustible gas, for example, a mixture of an argon gas, a carbon dioxide, and a carbon tetrafluoride. For example, the tube is filled with 3 atmospheric pressure of high-pressure mixed gas containing 93% Ar and 7% $CO_2$.

The system for inspecting an object includes one group of two or more than two planar position-sensitive detectors that arranged on an object to be imaged, and configured to provide the position and angle of the trajectory of the entered muons and electrons (that is, a direction in a 3D space). The position-sensitive detector is configured to measure the position and angle of the trajectory of the entered muons and electrons relative to two different directions. The muons and electrons pass through a passageway where the object may be located, and are scattered to the range of the materials thereof passing through the passageway. Another group of two or more than two planar position-sensitive detectors are configured to record the position and direction of the emergent muons and electrons. The drift tube in the detector is arranged to allow measurement of the position of the muons and electrons in a first direction, and measurement of the muons and electrons in a second direction which may be orthogonal to the first direction. A side detector may be configured to detect the trajectory of more muons and electrons in a horizontal direction. The scattering angle of each muon and electron is calculated according to the trajectory of the entered and exited muons and electrons.

According to an exemplary embodiment, generally a plurality of drift tubes are closely arranged, to form a super-layer structure. Each super layer includes orthogonally arranged two layers of drift tubes, to determine the two-dimensional coordinates of the incident particles. Within a shorter time period, the particles that are received by two layers of detectors spaced at a specific distance are considered to be the same charged particle.

According to an exemplary embodiment, generally a plurality of drift tubes are closely arranged to form a single layer, and then two single layers are orthogonally superposed to form a super layer, to determine the two-dimensional coordinates of the incident particles. To further improve the space resolution of the detector, each single layer may be improved to interleaved half tube superposition of closely arranged detector layers in two different directions. As such, a super layer actually includes two layers of detectors, sequentially indicating X-X-Y-Y directions. As such, the high-sensitivity position coordinates of the particles passing through the detector super layer may be determined. For example, the diameter of the drift tube is 4 cm, and the spatial position resolution of the drift tubes that are arranged in two rows may reach 2 cm.

Figure 6:
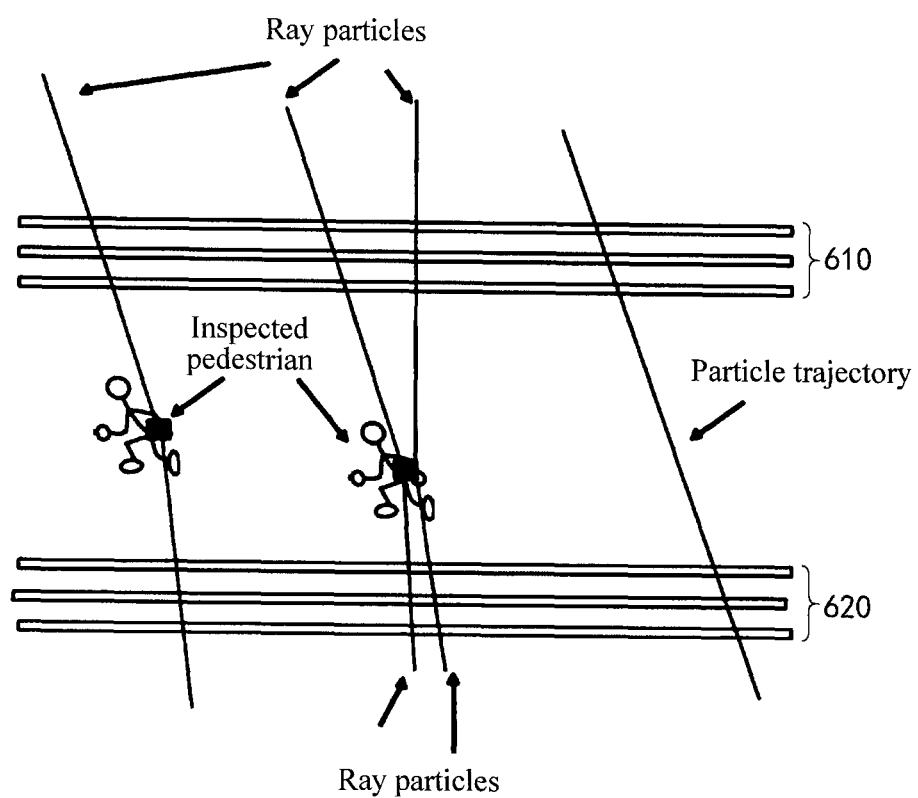
FIG. 6 schematically illustrates a structural diagram of a system for inspecting an object based on a cosmic ray according to an exemplary embodiment of the present disclosure.

FIG. 6 schematically illustrates a structural diagram of a system for inspecting an object based on a cosmic ray according to an exemplary embodiment of the present disclosure.

As illustrated in FIG. 6, the position-sensitive detector in the system for inspecting an object based on a cosmic ray is used as a part of the pedestrian inspection system. The position-sensitive detector is arranged in the inspection passageway (for example, the customary pedestrian passageway), wherein the inspected pedestrian passes through the position-sensitive detector. The position-sensitive detector includes: a first group of position-sensitive detectors 610, disposed on a first side of the inspection passageway, and configured to measure the position and direction of incident charged particles entering the inspection passageway; and a second group of position-sensitive detectors 620, disposed on a second side of the inspection passageway that is opposite to the first side, and configured to measure the position and direction of emergent charged particles exiting the inspection passageway.

According to an exemplary embodiment, the first group of position-sensitive detectors and the second group of position-sensitive detectors are arranged at upper and lower portions of the pedestrian passageway respectively, wherein the first group of position-sensitive detectors and the second group of position-sensitive detectors respectively include three super layers of drift tube arrays. When the cosmic ray passes through the human body, scattering and absorption occur, and the trajectory of the charged particles varies. The three super layers of drift tube arrays of the upper first group of position-sensitive detectors are configured to detect the time, position and direction of the charged particles of the incident cosmic ray, and the three super layers of drift tube arrays of the lower second group of position-sensitive detectors are configured to detect the time, position and direction of the charged particles of the emergent cosmic ray. As such, variation of the movement trajectory of the charged particles is obtained.

It should be noted that although it is illustrated in the drawings that each group of position-sensitive detectors include three super layers of drift tube arrays, in practice the super-layer structures in a corresponding quantity may be selected according to the actual needs in the application scenario, which causes no limitation to the present invention.

According to an exemplary embodiment, the signal processing unit (for example, a computer) in the system analyzes scattering of the muons and electrons in the passageway based on the measured entering and exiting position and direction of the muons and electrons, to acquire a scanning image reflecting the scattering intensity or radiation length, and space distribution of the scattering density in the passageway. The acquired scanning image or space distribution of the scattering density in the passageway may indicate whether the object is present or not in the passageway. The drift tube detector is arranged at a top portion or a bottom portion of the passageway. In some embodiments, more drift tube detectors may be deployed on the sides of the passageway, to form a box or four-side structure, and in such a structure, the parcels may enter the structure for scanning by the system.

In the system, the measurement of the muons and electrons generated by the cosmic ray in the inspected object by the signal processing unit may include: remodeling the trajectory of the muons and electrons passing through the passageway, measuring the momentum of the entered muons and electrons based on the signals from the detector, measuring the momentum of the exited muons and electrons based on the signals from the detector, and determining space distribution of the scattering density in the passageway. These steps and the other processing results may be used to reconstruct a tomoscan profile and measure various attributes of the inspected object.

For example, the remodeling of the trajectory of the muons and electrons passing through the detector may include: acquiring identifiers of the drift tubes struck by the muons and electrons and striking signals having a corresponding number of strikes; associating the identified real-time drift tubes with the trajectory of the specific muons and electrons of the detector; initially estimating the time zero values at the moments when the specific muons and electrons strike the drift tubes; determining a drift radius based on the estimation of the time zero value, the drift time conversion data and the striking time; fitting the linear trajectory to the drift radius corresponding to a specific time zero value; and searching and selecting a time zero value associated with the optional trajectory fitting performed for the specific muons and electrons, and calculating an error in the time zero value and the trajectory parameter. This provides a remodeled linear trajectory for the muons and electrons passing through the detector based on trajectory modeling based on time zero fitting.

In addition, for example, the measurement of the momentum of the entered and exited muons and electrons based on the signals from the detector may, for example, include: configuring a plurality of position-sensitive detectors to scatter the muons and electrons passing through the detectors; measuring scattering of the muons and electrons in the position-sensitive detector, wherein the measurement of scattering includes measurement of the positions of the scattered muons and electrons; determining at least one trajectory of the muons and electrons based on the measurement of the position; and determining at least one momentum measurement based on at least one trajectory. This technique may be used to determine the momentum of the muons and electrons based on the trajectory determined according to the scattering of the muons and electrons in the position-sensitive detector.

In addition, for example, the space distribution of the scattering density of the object may be determined based on the tomoscan imaging data of the muons and electrons according to the following steps: acquiring predetermined tomoscan imaging data of the muons and electrons corresponding to the scanning angle and the estimated momentum of the muons and electrons passing through the object; providing probability distribution of the scattering of the muons and electrons for use in the MLSD-OSEM algorithm, wherein the probability distribution is based on statistical multiple scattering models; and determining a basic likelihood estimation of the object density by using the MLSD-OSEM algorithm; and outputting a remodeled object scattering density. The remodeled object scattering density may be used to identify presence and/or category of an interested object based on the remodeled density data.

Figure 7:
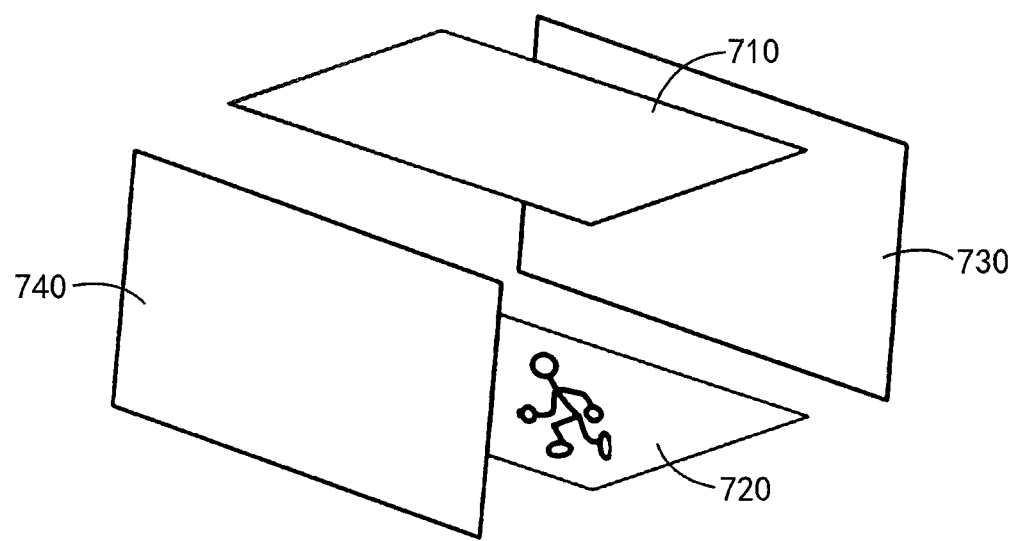
FIG. 7 schematically illustrates a structural diagram of a system for inspecting an object based on a cosmic ray according to an exemplary embodiment of the present disclosure.

FIG. 7 schematically illustrates a structural diagram of a system for inspecting an object based on a cosmic ray according to an exemplary embodiment of the present disclosure.

As illustrated in FIG. 7, as compared with the embodiment illustrated in FIG. 6, this embodiment is different in that: the position-sensitive detectors, in addition to the first group of position-sensitive detectors 710 and the second group of position-sensitive detectors 720, further include: a third group of position-sensitive detectors 730, which are arranged on a third side of the inspection passageway that is different from the first side and the second side, and configured to measure the position and direction of the emergent charged particles exiting the inspection passageway; and/or a fourth group of position-sensitive detectors 740, which are arranged on a fourth side of the inspection passageway that is different from the first, the second side and the third side, and configured to measure the position and direction of the emergent charged particles exiting the inspection passageway.

According to an exemplary embodiment, a large-area position-sensitive detector may be deployed on each of the left and right sides of the pedestrian passageway, as illustrated in FIG. 7. In this way, more information of the cosmic ray particles may be collected, the inspection speed and the imaging quality may be improved, and thus the efficiency may be improved.

According to an exemplary embodiment, the area of the position-sensitive detector may be increased, the length of the pedestrian passageway may be increased, or the number of charged particles of the cosmic ray passing through the human body may be increased, such that the inspection precision may be improved, and the false positives may be reduced.

With the method, apparatus and system for inspecting an object based on a cosmic ray according to the present disclosure, a pedestrian who is walking or moving is inspected by using a cosmic ray, such that nuclear materials, drugs, explosive materials and the like hazardous materials carried by the pedestrian may be detected. When an inspected pedestrian is waking in the passageway, a monitoring device is capable of monitoring and recording the position of the inspected pedestrian at a specific moment to acquire the movement trajectory thereof. A large-area position-sensitive detector is deployed in the passageway, to detect charged particles of the cosmic ray, wherein the charged particles of the cosmic ray are subjected to scattering or absorption by the pedestrian and the articles carried by the pedestrian. Coincidence is carried out between the time and position of the charged particles of the cosmic ray detected by the detector and the movement trajectory of the inspected pedestrian, such that such information as the category of the material of the article carried by the pedestrian may be acquired, prompt information is given indicating whether some prohibited articles are carried by the pedestrian. In this way, the inspection convenience is improved, and no hazards are caused to the human body because the natural cosmic ray is employed for inspection. Since the inspected pedestrian in the inspection is allowed to move and inspection may be carried out for a plurality of pedestrians simultaneously, the inspection is relatively flexible, convenient and efficient.

FIG. 1 and FIG. 2 schematically illustrate flowcharts of a method for inspecting an object based on a cosmic ray according to an exemplary embodiment of the present disclosure. The method, for example, may be implemented by using the apparatus and system for inspecting an object based on a cosmic ray as illustrated in FIG. 3, FIG. 4, FIG. 5, FIG. 6 or FIG. 7, which is not limited in the present disclosure. It should be noted that FIG. 1 and FIG. 2 only schematically illustrate, rather than limiting, the steps included in the method according to an exemplary embodiment of the present disclosure. For ease of understanding, the steps as illustrated in FIG. 1 and FIG. 2 do not indicate or limit the time sequence of these steps. In addition, for ease of understanding, these steps may be performed, for example, in a plurality of modules/processes/threads synchronously or asynchronously.

Based on the above description of the embodiments, a person skilled in the art would simply understand that the method and corresponding modules according to the embodiments of the present disclosure may be implemented by means of software or partial hardening of the software. Based on such understandings, the technical solutions according to the embodiments of the present disclosure may be essentially embodied in the form of a software product. The software product may be stored in a non-volatile storage medium such as a read only memory (ROM), a U disk, a mobile hard disk and the like. The software product includes a number of instructions that enable a computer device (a PC, a server, a mobile terminal, or a network device) to perform the method provided in the embodiments of the present disclosure.

A person skilled in the art may understand that the accompanying drawings are only intended to schematically illustrate the exemplary embodiments, and the modules or procedures in the drawings are not necessary for the embodiments of the present disclosure, which thus cause no limitation to the protection scope of the present disclosure.

A person skilled in the art would understand that the above modules may be arranged in the apparatus according to the description given in the embodiments, or may be subject to corresponding variations and arranged in one or a plurality of apparatuses different from that in this embodiment. The modules according to the above embodiments may be combined in one module, or split into a plurality of submodules.

Detailed above are exemplary embodiments of the present disclosure. It shall be understood that the present disclosure is not limited to the above exemplary embodiments. On the contrary, the present disclosure is intended to cover various modifications and equivalent deployments within the spirit and scope of the appended claims.

The invention claimed is:

1. A method for inspecting an object based on a cosmic ray, comprising:
   recording a movement trajectory of an inspected object by using a monitoring device, wherein the monitoring device comprises a plurality of depth camera covering a passageway for detecting and tracking the movement trajectory of the inspected object;
   acquiring information of charged particles in the cosmic ray by using a position-sensitive detector, the information of charged particles comprising trajectory information of the charged particles, wherein the information of the charged particles is updated in real time;
   performing position coincidence for information of the movement trajectory obtained from the plurality of depth cameras and the trajectory information of the charged particles to determine the object;
   performing trajectory remodeling for the charged particles according to the information of charged particles, wherein the performing trajectory remodeling for the charged particles according to the information of charged particles comprises:
      calculating a Ratio parameter of an material according to the trajectory information of the charged particles, and estimating an initial atomic number and an initial relative mass number of the material, the Ratio parameter being a ratio between a scattering parameter and a stopping parameter that are exerted by the material on the charged particles;
      calculating a radiation length according to a relationship between the initial atomic number and the radiation length and a relationship between the initial relative mass number and the radiation length;
      acquiring a thickness of the material according to the radiation length;
      calculating the stopping parameter and the scattering parameter of the material according to the initial atomic number, the initial relative mass number and the thickness of the material; and
      identifying the material according to the stopping parameter and the scattering parameter, wherein low atomic number materials are identified by using a stopping effect of electrons in the charged particles, and medium to high atomic number materials are identified by using a scattering effect of muons in the charged particles; and
   identifying a material inside the moving object according to the trajectory remodeling.

2. The method according to claim 1, wherein the position-sensitive detector is configured to have the capability of detecting the charged particles of the cosmic ray.

3. The method according to claim 2, wherein the position-sensitive detector is configured to have the capability of detecting medium to high atomic number materials whose atomic number is greater than that of aluminum, and low atomic number materials whose atomic number is lower than that of aluminum; wherein
   the low atomic number materials are identified by using a stopping effect of electrons; and
   the medium to high atomic number materials are identified by using a scattering effect of muons.

4. The method according to claim 1, wherein the position-sensitive detector comprises a GEM detector, an MRPC detector, a drift chamber or a drift tube array.

5. The method according to claim 1, wherein the position-sensitive detector is configured to act as a portion of a pedestrian inspection system, and the position-sensitive detector is disposed in an inspection passage, wherein an inspected pedestrian passes through the position-sensitive detector.

6. The method according to claim 1, further comprising:
reconstructing a material distribution diagram by using an imaging algorithm according to a corresponding relationship between the stopping parameter, the scattering parameter and material properties, wherein the imaging algorithm comprises PoCA algorithm and/or MLSD-OSEM algorithm.

7. The method according to claim 1, further comprising: updating material information to perform a next iteration.

8. The method according to claim 1, further comprising: determining a category characteristic of the material of the moving object according to a corresponding relationship between the stopping parameter, the scattering parameter and material properties, and identifying the material according to a non-parameter inspection method.

9. The method according to claim 1, wherein in the trajectory remodeling, a plurality of pieces of trajectory information of the charged particles are parallelly processed.

10. The method according to claim 1, wherein the trajectory information of the charged particles comprises time of incidence, position of incidence, direction of incidence, time of emergence, position of emergence and direction of emergence of the charged particles.

11. The method according to claim 10, wherein the performing position coincidence for the movement trajectory and the trajectory information to determine the object comprises:
performing a time difference analysis on the time of incidence and the time of emergence; and
coinciding the trajectory information of the charged particles with the time and position of the movement trajectory of the object according to the position of incidence, the position of emergence and the time different analysis.

12. An apparatus for inspecting an object based on a cosmic ray, comprising:
a processor;
a memory for storing instructions executable by the processor;
wherein the processor is configured to:
record a movement trajectory of an inspected object by using a monitoring device;
acquire information of charged particles in the cosmic ray by using a position-sensitive detector, the information of charged particles comprising trajectory information of the charged particles, wherein the information of the charged particles is updated in real time;
perform position coincidence for the movement trajectory and the trajectory information to determine the object;
perform trajectory remodeling for the charged particles according to the information of charged particles, wherein in performing the trajectory remodeling for the charged particles according to the information of charged particles, the processor is configured to:
calculate a Ratio parameter of a material according to the trajectory information of the charged particles and estimate an initial atomic number and an initial relative mass number of the material, the Ratio parameter being a ratio between a scattering parameter and a stopping parameter that are exerted by the material on the charged particles;
calculate a radiation length according to a relationship between the initial atomic number and the radiation length and a relationship between the initial relative mass number and the radiation length;
acquire a thickness of the material according to the radiation length; and
calculate the stopping parameter and the scattering parameter of the material according to the initial atomic number, the initial relative mass number and the thickness of the material, and identify the material according to the stopping parameter and the scattering parameter, wherein low atomic number materials are identified by using a stopping effect of electrons in the charged particles, and medium to high atomic number materials are identified by using a scattering effect of muons in the charged particles; and
identify a material inside the moving object according to the trajectory remodeling,
wherein the monitoring device comprises a plurality of depth camera covering a passageway for detecting and tracking the movement trajectory of the inspected object, and the movement trajectory is obtained from the plurality of depth cameras.

13. A system for inspecting an object based on a cosmic ray, comprising:
a monitoring device, configured to record a movement trajectory of an inspected object;
a position-sensitive detector, configured to detect information of charged particles in the cosmic ray, the information of charged particles comprising trajectory information of the charged particles, wherein the information of the charged particles is updated in real time; and
a console, configured to perform position coincidence for the movement trajectory and the trajectory information to determine the moving object, perform trajectory remodeling for the charged particles according to the information of charged particles, and identify a material inside the moving object according to the trajectory remodeling,
wherein in performing the trajectory remodeling for the charged particles according to the information of charged particles, the console is configured to:
calculate a Ratio parameter of a material according to the trajectory information of the charged particles and estimate an initial atomic number and an initial relative mass number of the material, the Ratio parameter being a ratio between a scattering parameter and a stopping parameter that are exerted by the material on the charged particles;
calculate a radiation length according to a relationship between the initial atomic number and the radiation length and a relationship between the initial relative mass number and the radiation length;
acquire a thickness of the material according to the radiation length; and
calculate the stopping parameter and the scattering parameter of the material according to the initial atomic number, the initial relative mass number and the thickness of the material, and identify the material according to the stopping parameter and the scattering parameter, wherein low atomic number materials are identified by using a stopping effect of electrons in the charged particles, and medium to high atomic number materials are identified by using a scattering effect of muons in the charged particles,
wherein the monitoring device comprises a plurality of depth camera covering a passageway for detecting and tracking the movement trajectory of the inspected object, and the movement trajectory is obtained from the plurality of depth cameras.

14. The system according to claim 13, wherein the position-sensitive detector is configured to have the capability of detecting the charged particles of the cosmic ray;

the position-sensitive detector is configured to have the capability of detecting medium to high atomic number materials whose atomic number is greater than that of aluminum, and low atomic number materials whose atomic number is lower than that of aluminum; wherein the low atomic number materials are identified by using a stopping effect of electrons; and the medium to high atomic number materials are identified by using a scattering effect of muons;

the position-sensitive detector is configured to act as a portion of a pedestrian inspection system, and the position-sensitive detector is disposed in an inspection passage, wherein an inspected pedestrian passes through the position-sensitive detector.

15. The system according to claim 14, wherein the position-sensitive detector comprises:

a first group of position-sensitive detectors, disposed on a first side of the inspection passageway, and configured to measure the position and direction of incident charged particles entering the inspection passageway;

a second group of position-sensitive detectors, disposed on a second side of the inspection passageway that is opposite to the first side, and configured to measure the position and direction of emergent charged particles exiting the inspection passageway;

a third group of position-sensitive detectors, disposed on a third side of the inspection passageway that is different from both the first side and the second side, and configured to measure the position and direction of the emergent charged particles exiting the inspection passageway; and a fourth group of position-sensitive detectors, disposed on a fourth side of the inspection passageway that is different from the first side, the second side and the third side, and configured to measure the position and direction of the emergent charged particles exiting the inspection passageway;

wherein the third group of position-sensitive detectors and/or the fourth group of position-sensitive detectors form an angle of greater than 90 degrees and less than 180 degrees with the second group of position-sensitive detectors.

16. The system according to claim 13, wherein the position-sensitive detector comprises a GEM detector, an MRPC detector, a drift chamber or a drift tube array;

the drift tube array is formed of a plurality of aluminum drift tubes that are arranged to a plurality of super-layer structures, wherein each super-layer structure at least comprises a first planar aluminum drift tube in a first direction and a second planar aluminum drift tube in a second direction that is different from the first direction;

the first planar aluminum drift tube and the second planar aluminum drift tube each comprise two rows aluminum drift tubes that are arranged to be parallel to each other.

17. The system according to claim 15, wherein the console comprises a signal processing unit, configured to receive data of a measurement signal of the incident charged particles from the first group of position-sensitive detectors and a measurement signal of the emergent charged particles from the second group and/or third group and/or fourth group of position-sensitive detectors, wherein based on the measured incident and emergent positions and directions of the charged particles, the signal processing unit analyzes scattering of the charged particles passing the material in the inspection passageway to acquire space distribution of a scattering center in the inspection passageway or trajectory remodeling of the charged particles.

18. The system according to claim 13, wherein the monitoring further device comprises one or any combination of: a thermal imager, a pressure sensor and an optical sensor.

* * * * *